United States Patent
Thomas et al.

(10) Patent No.: US 9,895,771 B2
(45) Date of Patent: Feb. 20, 2018

(54) LASER ABLATION FOR THE ENVIRONMENTALLY BENEFICIAL REMOVAL OF SURFACE COATINGS

(71) Applicants: James W. Thomas, Los Altos, CA (US); Mitchell R. Wool, Sunnyvale, CA (US); Robert L. Cargill, Trinidad, CA (US)

(72) Inventors: James W. Thomas, Los Altos, CA (US); Mitchell R. Wool, Sunnyvale, CA (US); Robert L. Cargill, Trinidad, CA (US)

(73) Assignee: General Lasertronics Corporation, San Jose, CA (US)

( * ) Notice: Subject to any disclaimer, the term of this patent is extended or adjusted under 35 U.S.C. 154(b) by 467 days.

(21) Appl. No.: 13/781,107

(22) Filed: Feb. 28, 2013

(65) Prior Publication Data
US 2013/0220982 A1    Aug. 29, 2013

Related U.S. Application Data

(60) Provisional application No. 61/604,368, filed on Feb. 28, 2012.

(51) Int. Cl.
*B23K 26/362* (2014.01)
*B23K 26/402* (2014.01)
(Continued)

(52) U.S. Cl.
CPC .......... *B23K 26/36* (2013.01); *B23K 26/0006* (2013.01); *B23K 26/0081* (2013.01); *B23K 2201/34* (2013.01)

(58) Field of Classification Search
CPC .. B23K 26/034; B23K 26/1405; B23K 26/16; B23K 26/324; B23K 26/3246;
(Continued)

(56) References Cited

U.S. PATENT DOCUMENTS 3,624,553 A * 11/1971 Van-Tran ............... H01S 5/30
                                                                  372/4
3,626,141 A    12/1971 Daly
(Continued)

FOREIGN PATENT DOCUMENTS

EP              91646 A1 * 10/1983
FR         2 661 371       4/1990
(Continued)

OTHER PUBLICATIONS

Friedrich, Craig. "Laser Ablation". Precision Micromanufacturing Processes: Applied to Miniaturization Technologies. Michigan Technological University (Published 1998) (Retrieved on Dec. 15, 2015 from Archive.org snapshot dated Jul. 5, 2010).*

(Continued)

*Primary Examiner* — Geoffrey S Evans
(74) *Attorney, Agent, or Firm* — Haverstock & Owens LLP

(57) ABSTRACT

A laser-based method of removing a coating from a surface comprises directing a laser pulse to a first position on the surface, removing the coating from the first position by rapidly elevating a surface temperature of the first position using the laser pulse and thereby disassociating the coating from the surface and collecting the disassociated coating. In some embodiments, the coating comprises an environmentally harmful substance such as Hexavalent Chromium. In some embodiments, the coating comprises Diamond-Like Carbon (DLC), Vitrified Contaminant Material (CMAS). The disassociated coating is collected by a waste collector.

26 Claims, 3 Drawing Sheets

(51) Int. Cl.
*B23K 26/36* (2014.01)
*B23K 26/00* (2014.01)
*B23K 101/34* (2006.01)

(58) Field of Classification Search
CPC ............ B23K 26/3266; B23K 26/3273; B23K 26/365; B23K 26/0626; B23K 26/362; B23K 26/402
USPC ....................................... 219/121.68, 121.69
See application file for complete search history.

(56) References Cited

U.S. PATENT DOCUMENTS

| | | | |
|---|---|---|---|
| 3,657,707 A | 4/1972 | McFarland et al. | |
| 3,843,865 A | 10/1974 | Nath | |
| 3,941,973 A | 3/1976 | Luck, Jr. et al. | |
| 4,114,018 A | 9/1978 | Von Allmen et al. | |
| 4,148,057 A | 4/1979 | Jesse | |
| 4,207,874 A | 6/1980 | Choy | |
| 4,328,068 A | 5/1982 | Curtis | |
| 4,398,790 A | 8/1983 | Righini et al. | |
| 4,449,043 A | 5/1984 | Husbands | |
| 4,521,070 A | 6/1985 | Scottini et al. | |
| 4,543,477 A | 9/1985 | Doi et al. | |
| 4,564,736 A | 1/1986 | Jones et al. | |
| 4,566,937 A | 1/1986 | Pitts | |
| 4,584,455 A | 4/1986 | Tomizawa | |
| 4,588,885 A | 5/1986 | Lovoi et al. | |
| 4,644,948 A | 2/1987 | Lang et al. | |
| 4,654,532 A | 5/1987 | Hirshfield | |
| 4,665,377 A | 5/1987 | Harpaintner | |
| 4,671,848 A | 6/1987 | Miller et al. | |
| 4,676,586 A | 6/1987 | Jones et al. | |
| 4,687,918 A | 8/1987 | Hughes et al. | |
| 4,695,698 A | 9/1987 | Mayor et al. | |
| 4,707,073 A | 11/1987 | Kocher | |
| 4,729,621 A | 3/1988 | Edelman | |
| 4,737,004 A | 4/1988 | Amitay et al. | |
| 4,737,628 A | 4/1988 | Lovoi | |
| 4,749,840 A | 6/1988 | Piwczyk | |
| 4,756,756 A | 7/1988 | Woodroffe | |
| 4,762,385 A | 8/1988 | Fuse | |
| 4,799,755 A | 1/1989 | Jones | |
| 4,807,954 A | 2/1989 | Oyamada et al. | |
| 4,818,049 A | 4/1989 | Assenheim et al. | |
| 4,818,062 A | 4/1989 | Schifres et al. | |
| 4,821,943 A | 4/1989 | Gaudin et al. | |
| 4,842,360 A | 6/1989 | Caro et al. | |
| 4,844,574 A | 7/1989 | Chande | |
| 4,844,947 A | 7/1989 | Kanser et al. | |
| 4,859,075 A | 8/1989 | Sutter, Jr. et al. | |
| 4,876,444 A | 10/1989 | Field | |
| 4,880,959 A | 11/1989 | Baum et al. | |
| 4,900,891 A | 2/1990 | Vega et al. | |
| 4,920,994 A | 5/1990 | Nachbar | |
| 4,928,695 A | 5/1990 | Goldman et al. | |
| 4,931,616 A | 6/1990 | Usui et al. | |
| 4,960,988 A | 10/1990 | Simms | |
| 4,986,664 A | 1/1991 | Lovoi | |
| 4,994,567 A | 2/1991 | Crisp et al. | |
| 4,994,639 A | 2/1991 | Dickinson et al. | |
| 5,006,268 A | 4/1991 | Griffaton | |
| 5,014,207 A | 5/1991 | Lawton | |
| 5,040,479 A | 8/1991 | Thrash | |
| 5,068,750 A | 11/1991 | Cook et al. | |
| RE33,777 E | 12/1991 | Woodroffe | |
| 5,081,350 A | 1/1992 | Iwasaki et al. | |
| 5,107,445 A | 4/1992 | Jensen et al. | |
| 5,113,802 A | 5/1992 | Le Blanc | |
| 5,151,134 A | 9/1992 | Boquillion et al. | |
| 5,194,723 A | 3/1993 | Cates et al. | |
| 5,210,944 A * | 5/1993 | Monson | F01D 5/286 29/889.1 |
| 5,216,808 A * | 6/1993 | Martus | B23K 26/032 29/889.1 |
| 5,229,593 A | 7/1993 | Cato | |
| 5,245,682 A | 9/1993 | Ortiz et al. | |
| 5,281,798 A | 1/1994 | Hamm et al. | |
| 5,291,570 A | 3/1994 | Filgas et al. | |
| 5,293,023 A | 3/1994 | Haruta et al. | |
| 5,328,517 A | 7/1994 | Cates et al. | |
| 5,333,218 A | 7/1994 | Ortiz et al. | |
| 5,355,063 A | 10/1994 | Boone et al. | |
| 5,364,390 A | 11/1994 | Taboada et al. | |
| 5,371,582 A | 12/1994 | Toba et al. | |
| 5,373,140 A | 12/1994 | Nagy et al. | |
| 5,386,112 A | 1/1995 | Dixon | |
| 5,395,362 A | 3/1995 | Sacharoff et al. | |
| 5,446,256 A | 8/1995 | Cartry | |
| 5,451,765 A | 9/1995 | Gerber | |
| 5,526,167 A | 6/1996 | Peng | |
| 5,531,857 A | 7/1996 | Engelsberg et al. | |
| 5,548,113 A | 8/1996 | Goldberg et al. | |
| 5,558,666 A | 9/1996 | Dewey et al. | |
| 5,571,335 A * | 11/1996 | Lloyd | B08B 7/0085 134/1 |
| 5,581,346 A | 12/1996 | Sopori | |
| 5,589,089 A | 12/1996 | Usegi | |
| 5,592,879 A | 1/1997 | Waizmann | |
| 5,610,753 A | 3/1997 | Kessler et al. | |
| 5,613,509 A * | 3/1997 | Kolb | B24C 1/003 134/1 |
| 5,637,245 A | 6/1997 | Shelton | |
| 5,643,476 A | 7/1997 | Garmire et al. | |
| 5,656,186 A * | 8/1997 | Mourou et al. | 219/121.69 |
| 5,662,762 A | 9/1997 | Ranalli | |
| 5,720,894 A | 2/1998 | Neev | |
| 5,767,479 A | 6/1998 | Kanaoka | |
| 5,780,806 A * | 7/1998 | Ferguson | B08B 7/0042 134/1 |
| 5,784,162 A | 7/1998 | Cabib et al. | |
| 5,790,046 A | 8/1998 | Blossfeld | |
| 5,805,275 A | 9/1998 | Taylor | |
| 5,845,646 A | 12/1998 | Lemelson | |
| 5,864,114 A | 1/1999 | Fukuda | |
| 5,889,253 A | 3/1999 | Kanaoka | |
| 5,954,712 A | 9/1999 | Goodman | |
| 5,986,234 A | 11/1999 | Mathews et al. | |
| 6,040,549 A | 3/2000 | Kanaoka | |
| 6,040,553 A * | 3/2000 | Ross | B23K 26/382 219/121.71 |
| 6,165,170 A | 12/2000 | Wynne et al. | |
| 6,215,094 B1 | 4/2001 | Dausinger et al. | |
| 6,285,002 B1 | 9/2001 | Ngoi et al. | |
| 6,288,362 B1 | 9/2001 | Thomas et al. | |
| 6,313,435 B1 | 11/2001 | Shoemaker et al. | |
| 6,323,457 B1 | 11/2001 | Jung | |
| 6,347,976 B1 | 2/2002 | Lawton et al. | |
| 6,383,177 B1 | 5/2002 | Balle-Peterson et al. | |
| 6,384,370 B1 | 5/2002 | Tsunemi et al. | |
| 6,414,263 B1 | 7/2002 | Uchida | |
| 6,437,285 B1 | 8/2002 | Thomas et al. | |
| 6,494,960 B1 * | 12/2002 | Macdonald et al. | 134/3 |
| 6,635,844 B2 | 10/2003 | Yu | |
| 6,664,499 B1 | 12/2003 | Brink et al. | |
| 6,693,255 B2 * | 2/2004 | Freiwald | B08B 7/0042 219/121.68 |
| 6,864,478 B2 | 3/2005 | Schroder | |
| 6,924,457 B2 | 8/2005 | Koyoma et al. | |
| 6,927,917 B2 | 8/2005 | Kiruma | |
| 7,009,141 B1 | 3/2006 | Wool et al. | |
| 7,170,030 B2 | 1/2007 | Haight | |
| 7,265,033 B2 | 9/2007 | Shigematsu et al. | |
| 7,381,383 B1 * | 6/2008 | Yokoyama | B01D 53/002 266/144 |
| 7,397,014 B2 | 7/2008 | Hart et al. | |
| 7,407,591 B2 * | 8/2008 | De Battisti et al. | 210/757 |
| 7,408,130 B2 | 8/2008 | Sonoda et al. | |
| 7,429,470 B2 * | 9/2008 | Lee | B01L 3/502761 435/173.1 |
| 7,452,476 B2 | 11/2008 | Bayer et al. | |
| 7,525,065 B2 * | 4/2009 | Engler | B08B 7/0042 219/121.69 |

(56) References Cited

U.S. PATENT DOCUMENTS

| | | | |
|---|---|---|---|
| 7,535,565 B1* | 5/2009 | Viertl et al. | 356/318 |
| 7,632,420 B2 | 12/2009 | Thomas | |
| 7,633,033 B2 | 12/2009 | Thomas et al. | |
| 7,800,014 B2 | 9/2010 | Thomas et al. | |
| 7,867,404 B2* | 1/2011 | Deutsch | 216/13 |
| 8,030,594 B2 | 10/2011 | Thomas et al. | |
| 8,182,609 B1* | 5/2012 | Le Claire | B08B 7/0042 134/1 |
| 8,246,172 B2 | 8/2012 | Amano | |
| 8,348,655 B2 | 1/2013 | Kazusako et al. | |
| 8,604,380 B2* | 12/2013 | Howerton et al. | 219/121.6 |
| 8,687,189 B2* | 4/2014 | Agrawal et al. | 356/318 |
| 8,980,639 B2* | 3/2015 | Clark et al. | 436/80 |
| 2002/0134770 A1 | 9/2002 | Freiwald et al. | |
| 2002/0153361 A1 | 10/2002 | Sakamoto | |
| 2003/0040164 A1 | 2/2003 | Inoue et al. | |
| 2003/0062349 A1 | 4/2003 | Suh et al. | |
| 2003/0169167 A1 | 9/2003 | Fey et al. | |
| 2004/0045497 A1 | 3/2004 | Kriews et al. | |
| 2004/0057047 A1 | 3/2004 | Knebel | |
| 2004/0199151 A1 | 10/2004 | Neuberger | |
| 2004/0219286 A1* | 11/2004 | Flanagan | B05D 3/065 427/558 |
| 2005/0072612 A1 | 4/2005 | Maggio | |
| 2005/0150878 A1 | 7/2005 | Thomas et al. | |
| 2005/0211680 A1 | 9/2005 | Li | |
| 2005/0224474 A1* | 10/2005 | Kilburn | B08B 7/0042 219/121.68 |
| 2005/0233547 A1 | 10/2005 | Noda et al. | |
| 2006/0000488 A1 | 1/2006 | Claar et al. | |
| 2006/0151433 A1* | 7/2006 | Chang et al. | 216/81 |
| 2006/0186098 A1 | 8/2006 | Caristan | |
| 2006/0273896 A1 | 12/2006 | Kates | |
| 2007/0000885 A1 | 1/2007 | Thomas et al. | |
| 2007/0051708 A1 | 3/2007 | Talwar et al. | |
| 2007/0224768 A1 | 9/2007 | Chaplick et al. | |
| 2008/0006615 A1 | 1/2008 | Rosario et al. | |
| 2009/0007933 A1 | 1/2009 | Thomas et al. | |
| 2009/0242527 A1 | 10/2009 | Anger | |
| 2010/0033817 A1 | 2/2010 | Ono | |
| 2010/0093112 A1 | 4/2010 | Takagi et al. | |
| 2010/0134628 A1 | 6/2010 | Pfitzner et al. | |
| 2010/0176101 A1 | 7/2010 | Costin et al. | |
| 2010/0243625 A1* | 9/2010 | Osako | 219/121.72 |
| 2010/0272961 A1 | 10/2010 | Costin, Jr. | |
| 2011/0024400 A1 | 2/2011 | Rumsby | |
| 2011/0088720 A1* | 4/2011 | Varanasi et al. | 134/3 |
| 2011/0168679 A1* | 7/2011 | Qi et al. | 219/75 |
| 2011/0186553 A1* | 8/2011 | Chung | 219/121.69 |
| 2011/0206071 A1 | 8/2011 | Karavitis | |
| 2011/0240617 A1 | 10/2011 | Ku | |
| 2012/0086934 A1 | 4/2012 | Digonnet | |
| 2013/0036380 A1 | 2/2013 | Symons | |
| 2013/0136744 A1* | 5/2013 | Bouche | A61K 39/395 424/135.1 |
| 2013/0199732 A1 | 8/2013 | Niwa et al. | |

FOREIGN PATENT DOCUMENTS

| | | |
|---|---|---|
| FR | 2 689 423 | 4/1990 |
| GB | 2 246 099 A | 1/1992 |
| GB | 2 402 230 B | 12/2004 |
| GB | 2481190 A * | 12/2011 |
| JP | 01203090 A | 8/1989 |
| JP | 02263854 A | 10/1990 |
| JP | 05082276 A | 4/1993 |
| JP | 05138377 A | 6/1993 |
| JP | 10309516 A | 11/1998 |
| JP | 2000103607 A | 4/2000 |
| JP | 2001300755 A | 1/2001 |
| JP | 200168829 A | 3/2001 |
| JP | 361161781 A | 6/2003 |
| WO | 8301400 | 4/1983 |
| WO | 2004039531 A2 | 10/2004 |

OTHER PUBLICATIONS

Kononenko et al., "Ablation of CVD diamond with nanosecond laser pulses of UV-IR range", Apr. 1998, Elsevier, Diamond and Related Materials, vol. 7, pp. 1623-1627.*

Motelica-Heino et al., "Macro and microchemistry of trace metals in vitrified domestic wastes by laser ablation ICP-MS and scanning electron microprobe X-Ray energy dispersive spectroscopy", Aug. 1998, Elsevier, Talanta, pp. 407-422.*

Hagans et al., "Chromate Conversion Coatings", Dec. 1994, ASM Handbook, vol. 5: Surface Engineering, pp. 405-411.*

Robertson, "Diamond-like amorphous carbon", Dec. 2002, Elsevier, Materials Science and Engineering R, vol. 37, pp. 129-281.*

"Photonic Cleaning Process Moves to Heavy Industry," Mar. 1997, p. 22, Photonics Spectra.

Freiwald et al., "Laser Ablation of Contaminants from Concrete and Metals Surfaces," Dec. 1994, pp. 1-53, F2 Associates, Incorporated.

INTA, "Radiant Energy Based Cleaning and Coating Removal Technology Comparison," Aug. 8, 1994, pp. 1-26,, Manufacturing Technology Special Advanced Studies.

Barone, Philip A. "Automated Laser Paint Stripping (ALPS)," Jun. 1, 1992, pp. AD92-206-1 through AD92-206-17, Society of Manufacturing Engineers.

"The Company The Technology," Apr. 1997, General Lasertronics Corporation.

"Lasertronics Corporate Overview," Apr. 1997, Lasertronics Engineering Excellence.

"Lasertronics Aircraft Paint Removal," Apr. 1997, Lasertronics Engineering Excellence.

"Lasertronics Radiation/Medical Decontamination," Apr. 1997, Lasertronics Engineering Excellence.

"Lasertronics Grafitti Abatement," Apr. 1997, Lasertronics Engineering Excellence.

"Lasertronics Lead-Based Paint Removal," Apr. 1997, Lasertronics Engineering Excellence.

Driscoll et al., "Handbook of Optics," Dec. 1978, pp. 13-6 through 13-10, McGraw-Hill Book Company.

Liu et al., "Paint Removal Using Lasers," Jul. 20, 1995, pp. 4409-4414, Applied Optics, vol. 34, No. 21.

Lovoi, Paul, "Laser Paint Stripping Offers Control and Flexibility," Nov. 1994, pp. 75-80, Laser Focus World.

Bonkowski et al., "CW Laser Paint Stripping," Aug. 1991, pp. 1-20, The Laser Institute and National Science and Engineering Research Council.

Lovoi, Paul, "Laser/Robot Paint Stripping, Laser Ablation Coating Removal," Apr. 1988, International Technical Associates.

Tavernier et al., "Photoluminescence from laser assisted debonded epitaxial GaN and ZnO films", Applied Physics Letters 74(18), pp. 2678-2680 (May 3, 1999).

Horie et al., "Interface structure modified by plasma-surface interaction and its effect on ablative hole opening process in bilayer system of Te Sef film and a fluorocarbon subbing layer", Journal of Applied Physics 77, 162-166 (Jan. 1995), American Institute of Physics.

* cited by examiner

LASER ABLATION FOR THE ENVIRONMENTALLY BENEFICIAL REMOVAL OF SURFACE COATINGS

RELATED APPLICATIONS

This application claims priority of U.S. provisional application, Ser. No. 61/604,368, filed Feb. 28, 2012, and entitled "Laser Ablation for the Environmentally Beneficial Removal of Three Substances; Diamond-Like-Carbon (DLC), Vitrified Contaminant Materials (CMAS), and Paints/Primers containing Hexavalent Chromium," which is incorporated herein by reference.

FIELD OF THE INVENTION

The invention relates to ablating a coating using a laser. In particular, the invention relates to a laser apparatus that operates at conditions for removal of coatings such that the process is environmentally beneficial in comparison to other removal mechanisms.

BACKGROUND OF THE INVENTION

Laser-based coating removal systems use pulses of light from high power lasers to ablate or vaporize the paint or other coating from a surface. Ablation is the thermochemical disassociation, vaporization, and removal of material because of the incident convective and radiant energy. FIG. 1 illustrates the surface action phenomena during a typical ablation process.

Commercially-available lasers have the capability to generate pulses of radiant energy for suitable duration to achieve ablation conditions without significant convective heat transfer. Specifically, laser-induced ablation can be limited to the material surface through the appropriate selection of laser wavelength and active control of the radiative heat transfer rate and duration. The important application is the removal of the coatings and finishes from substrate structures that must be protected and reused. The radiative energy input must be significant, but the heat conduction into the substrate must be minimized. The amount of heat conduction into the substrate is affected by the radiant energy and the material surface of the substrate. The wavelength, irradiance, and pulse width of the radiant energy impact the amount of heat conduction into the substrate. The substrate properties, including transmissivity, absorptivity, emissivity, density, specific heat, thermal conductivity, and ablation onset thermochemistry (i.e. melt, vaporization, and surface chemical reaction temperatures), also affect the heat conduction into the substrate.

Wavelength is an important parameter because it must be selected to minimize the transmissivity of the radiant energy into the substrate. Thus, the radiant energy is absorbed at the surface. A high absorptivity of the material surface is also valuable, as this reduces the amount of laser energy needed to achieve a desired ablation rate. In many applications, such as metal substrates below a surface coating, low substrate absorptivity is also advantageous, because this limits the potential for ablation after the surface material is removed. Alternatively, substrate ablation for highly absorbing substrates may need to be limited by the use of active surface recognition prior to the initiation of the laser radiant energy pulse.

SUMMARY OF THE INVENTION

Embodiments of the present invention are directed to a laser-based coating removal method and system to remove an identified coating in a process that is environmentally beneficial in comparison to other removal mechanisms. The method comprises directing a laser pulse to a first position on a surface having an identified coating. The laser pulse rapidly elevates the surface temperature at the first position and causes the coating to disassociate from the surface. After the coating has disassociated from the surface it is able to be collected and safely disposed.

In one aspect a laser-based method of removing a coating from a surface comprises directing a laser pulse to a first position on the surface, removing the coating from the first position by rapidly elevating a surface temperature of the first position using the laser pulse and thereby disassociating the coating from the surface and collecting the disassociated coating. In some embodiments the coating comprises an environmentally harmful substance such as Hexavalent Chromium. In some embodiments the coating comprises Diamond-Like Carbon (DLC) or Vitrified Contaminant Material (CMAS). In some embodiments, the surface temperature of the first position is elevated to the oxidation temperature of the DLC and it is converted to vapor-phase carbon dioxide before it is collected. In further embodiments, the surface temperature of the first position is elevated so that the components of the CMAS are disassociated from the surface by disrupting the chemical bonds and the admixture is disaggregated. In still further embodiments, the surface temperature of the first position is elevated to a temperature at which the hexavalent chromium is disassociated from the surface and reduced to a particulate form of trivalent chromium. In some embodiments, the disassociated coating is collected by a waste collector. In further embodiments, the heat conduction into the surface from the laser pulse is limited. In some embodiments, the disassociation occurs essentially independent of the laser wavelength. In some embodiments, the laser pulse is moved to a second position in order to remove a coating from the second position.

In another aspect, a laser-based coating removal system comprises a surface comprising a coating and a laser based removal apparatus comprising a laser source to provide a laser pulse to a first position on the surface, wherein the laser source removes the coating from the surface by rapidly elevating a surface temperature of the first position using the laser pulse and thereby disassociating the coating from the surface. In some embodiments, the coating comprises an environmentally harmful substance such as Hexavalent Chromium. In some embodiments, the coating comprises Diamond-Like Carbon (DLC) or Vitrified Contaminant Material (CMAS). In some embodiments, the surface temperature of the first position is elevated to the oxidation temperature of the DLC and it is converted to vapor-phase carbon dioxide before it is collected. In further embodiments, the surface temperature of the first position is elevated so that the components of the CMAS are disassociated from the surface by disrupting the chemical bonds and the admixture is disaggregated. In still further embodiments, the surface temperature of the first position is elevated to a temperature at which the hexavalent chromium is disassociated from the surface and reduced to a particulate form of trivalent chromium. In some embodiments, the disassociated coating is collected by a waste collector. In some embodiments, the heat conduction into the surface from the laser pulse is limited. In further embodiments, the disassociation occurs essentially independent of the laser wavelength.

In a further aspect, a method for removing Diamond-Like Carbon (DLC) from a surface comprises directing a laser pulse to a first position on the surface, elevating a surface temperature of the first position using the laser pulse to an oxidation temperature of the DLC thereby converting it to vapor-phase carbon dioxide and collecting the disassociated DLC from the surface.

In still a further aspect, a method of removing Vitrified Contaminant Material (CMAS) from a surface comprises directing a laser pulse to a first position on the surface, elevating a surface temperature of the first position using the laser pulse to disassociate the components of the CMAS from the surface and disaggregating the admixture and collecting the disassociated CMAS from the surface.

In another aspect, a method for removing Hexavalent Chromium from a surface comprises directing a laser pulse to a first position on the surface, elevating a surface temperature of the first position using the laser pulse to a temperature at which the hexavalent chromium is disassociated from the surface and reduced to a particulate form of trivalent chromium and particulate effluent, and collecting the trivalent chromium and particulate effluent from the surface.

BRIEF DESCRIPTION OF THE DRAWINGS

Embodiments of the invention are described relative to the several views of the drawings. Where appropriate and only where identical elements are disclosed and shown in more than one drawing, the same reference numeral will be used to represent such identical elements.

DETAILED DESCRIPTION OF THE PRESENT INVENTION

Figure 1:
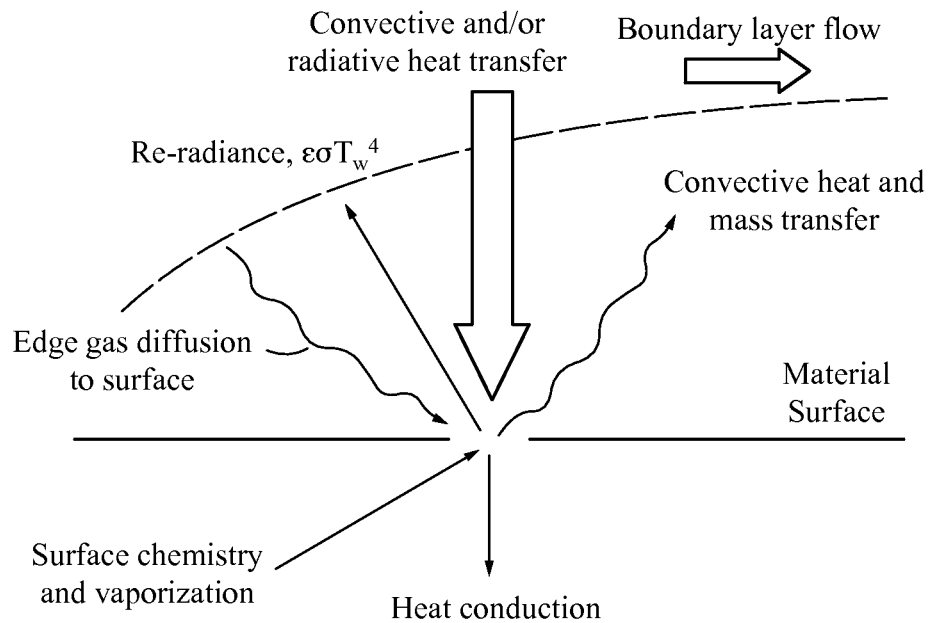
FIG. 1 illustrates the surface interaction phenomena during an ablation process.

Reference will now be made in detail to implementations of a laser-based coating removal system and method as illustrated in the accompanying drawings. The same reference indicators will be used through the drawings and the following detailed description to refer to the same or like parts. In the interest of clarity, not all of the routine features of the implementations described herein are shown and described. It will also be appreciated that in the development of any such actual implementation, numerous implementation-specific decisions be made to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Embodiments of the present invention are directed to a laser-based coating removal method and system to remove an identified coating from a surface in a process that is environmentally beneficial in comparison to other removal mechanisms. The system comprises a laser source to provide a laser light, a routing element coupled to the laser source and configured to direct the laser light onto a target region of the surface thereby removing the coating from the target region. In some embodiments, the system comprises a detection means to detect the coating as the coating disassociates from the target region of the surface. In some embodiments, the system comprises a waste collector for collecting the coating that has been removed.

A laser-based method for removing an identified coating from a surface is able to remove the identified coating in an environmentally beneficial manner. A laser pulse is directed to the surface in order to raise the temperature on the surface of the coating. When the temperature of the surface reaches a critical point, the coating disassociates from the surface and is able to be collected and safely disposed. Using a laser-based method avoids media-blast or chemically based processes that are time consuming and generate significant toxic waste. The laser-based method rapidly raises the temperature of the surface to its critical point under strictly controlled operating parameters in order to induce the desired effects.

In some embodiments, the system and method is used to selectively remove the identified coatings Diamond-Like Carbon (DLC), Vitrified Contaminants (CMAS), and primers and paints containing hexavalent chromium in an environmentally beneficial manner. However, the system is able to selectively remove other environmentally harmful chemicals as desired.

Diamond-Like Carbon (DLC)

DLC exists in different forms of carbon atoms that display some of the typical properties of diamond. DLC is applied as coatings to other materials in order to benefit from the diamond-like properties. Particularly, the value of a DLC coating accrues from its ability to provide properties of diamond to the surface of almost any material. These properties include hardness, wear, resistance, x-ray transparency, high thermal conductivity, and low friction. For example, a DLC film friction coefficient against polished steel ranges from 0.05-0.20. DLC is often applied in order to reduce the abrasive wear in high-load bearing surfaces, cutting tools, and press molds.

Removal of the DLC coating for substrate inspection and repair poses a significant challenge because of the coating's hardness and chemical resistance. Consequently, DLC film removal is sometimes attempted using an oxygen-dominated plasma beam to generate an appropriate ionized oxygen gas flow rate that etches the DLC film in a manner proportional to the treatment time. Alternatively, DLC may be removed by electrolyzing the film in an acid solution. However, these methods are limited by the processing rate, incomplete removal of the DLC film, access to confined spaces, field operability and/or waste chemical generation.

A laser-based method for DLC removal is able to remove DLC by impinging high irradiance laser pulses on a target DLC surface in an oxygen-rich environment. The laser pulse contacts the surface and immediately elevates the DLC to its carbon dioxide temperature, thereby rapidly and cleanly converting the DLC to vapor phase carbon dioxide. When the DLC has been converted to the vapor phase carbon dioxide it is able to be collected and safely disposed. Additionally, the limited heat conduction into the substrate provided by the laser process protects the coated surface from damage. In some embodiments, closed-loop feedback control immediately suppresses the beam when the DLC coating is completely removed.

Figure 2:
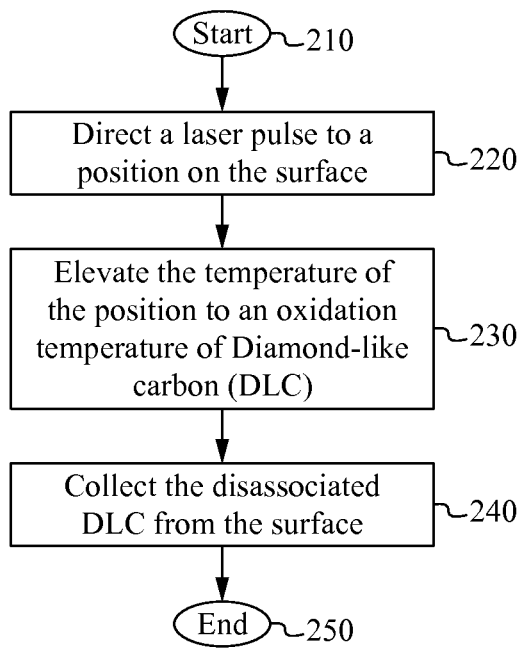
FIG. 2 illustrates a laser-based method for removing an identified coating from a surface according to some embodiments.

FIG. 2 illustrates a laser-based method of removing DLC from a surface in accordance with some embodiments. The method begins in the step 210. In the step 220, a laser pulse is directed to a position of the DLC on a surface of the substrate. In the step 230, a surface temperature of the position is elevated using the laser pulse to an oxidation temperature of the DLC. When the DLC reaches the oxidation temperature it is converted to vapor phase carbon dioxide and disassociates from the surface of the substrate. After the DLC disassociates from the surface it is able to be collected in the step 240 and disposed. As described above, the laser pulse contacts the surface and immediately elevates the DLC to vapor phase carbon dioxide, disassociating it from the surface of the substrate. The limited heat conduction into the substrate protects the coated surface from damage.

Vitrified Contaminant Material (CMAS)

Operation of gas turbine engines in typical environments leads to ingestion of significant mounts of sand, dust, volcanic ash, and other atmospheric contaminants and containing oxides of Calcium, Magnesium, Aluminum, and Silicon (CMAS). In the high temperature, high pressure sections of these engines, the contaminants vitrify and accumulate on the turbine flow surfaces. The accumulations cannot be readily removed with conventional media blast or chemical exposure methods. Consequently, the conventional cleaning methods entail dismantling the engine, removing the contaminated component and then exposing the surfaces to a highly-concentrated acid bath for a protracted period. The acid baths are a toxic exposure hazard to personnel and the environment while only partially removing the contaminants.

A laser-based method is able to remove the CMAS quickly and completely from exposed surfaces and small openings such as bleed air holes, pores, cracks, and crevices. In some embodiments, laser-based cleaning may be accomplished in situ or on subassemblies removed from the engine. A high irradiance laser pulse produces a rapid temperature rise of the surface of the CMAS and simultaneously disassociates the CMAS components, disrupts the amorphous chemical bonds and disaggregates the admixtures. Once the CMAS is disassociated from the surface, purge air is able to be directed towards the point of ablation and adjacent vacuum collectors result in a rapid and thorough cleaning of the surfaces within the focal range of the laser delivery device.

Figure 3:
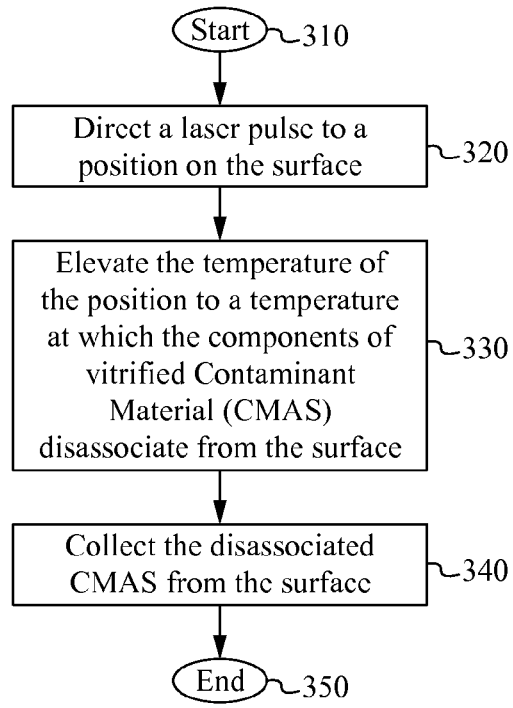
FIG. 3 illustrates a laser-based method for removing an identified coating from a surface according to some embodiments.

FIG. 3 illustrates a method of removing vitrified contaminant material (CMAS) from a surface in accordance with some embodiments. The method begins in the step 310. In the step 320, a laser pulse is directed to a position of the CMAS on the surface of the substrate. Then, in the step 330, a surface temperature of the position is elevated using the laser pulse to a temperature at which the CMAS disassociates from the surface and disaggregates. After the CMAS disassociates from the surface it is able to be collected in the step 340 and disposed. In some embodiments, the CMAS is collected by utilizing purge air and vacuum collectors to direct the CMAS to a waste collector. As described above, the laser pulse produces a rapid temperature rise of the surface of the CMAS and simultaneously disassociates the CMAS components, disrupts the amorphous chemical bonds and disaggregates the admixtures.

Hexavalent Chromium Removal and Conversion to Trivalent

Paints and primers such as used in numerous applications include compounds containing hexavalent chromium, often in the form of zinc chromate ($ZnCrO_4$). $ZnCrO_4$ is a chemical compound containing the chromate anion, appearing as an odorless yellow solid powder and is used industrially in chromate conversion coatings. Its use as a corrosion resistant agent was applied to aluminum alloy parts first in commercial aircraft, then in military aircraft. During the 1940's and 1950's it was used as paint in the wheel wells of retractable landing gear of military aircraft to protect the aluminum from corrosion. It is also used on many systems as a primer.

Chromates such as $ZnCrO_4$ have been linked to occupational diseases, specifically dermatitis, nasal irritation, and lung cancer. As a result, numerous organizations have directed abatement programs and with varying degrees of success. Removal of $ZnCrO_4$ coatings using standard abrasive methods such as media blast or sanding, or the use of solvents results in an unacceptable level of operator exposure and generates large toxic waste streams.

A laser-based ablation method for zinc chromate rapidly removes the zinc chromate coat without damaging the substrate material while simultaneously converting the hexavalent chromium to less toxic particulate forms of trivalent chromium ($Cr_2O_3$). The less-toxic particulate effluent is then able to be collected by conventional filtration techniques. Impingement of a high irradiance laser pulse on the surface of a coating with $ZnCrO_4$ rapidly raises the surface temperature of the coating to a value at which the hexavalent chromium is reduced to its triavalent form. For example, in some embodiments, the elevated temperature created by the laser pulse drives the following equilibrium chemical reaction completely to the right.

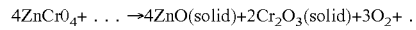

$$4ZnCrO_4 + \ldots \rightarrow 4ZnO(solid) + 2Cr_2O_3(solid) + 3O_2 + \ldots$$

Figure 4:
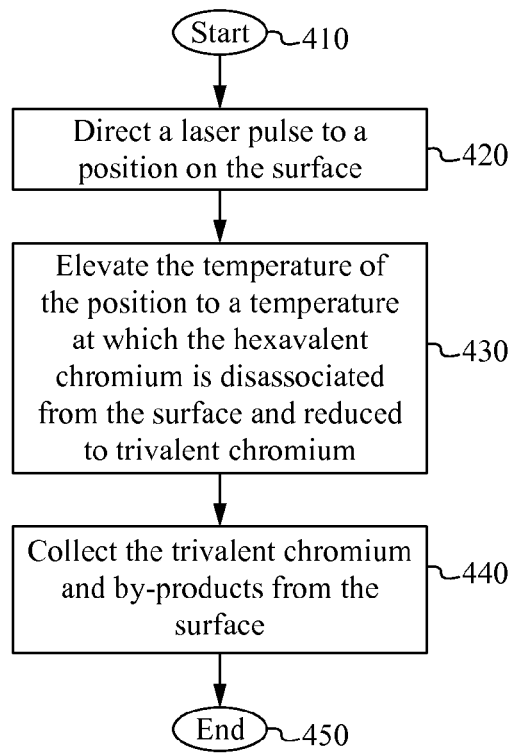
FIG. 4 illustrates a laser-based method for removing an identified coating from a surface according to some embodiments.

FIG. 4 illustrates a method of removing hexavalent chromium from a surface of a substrate in accordance with some embodiments. The method begins in the step 410. In the step 420, a laser pulse is directed to a position of the hexavalent chromium on a surface of a substrate. In the step 430, the temperature at the position is elevated using the laser pulse to a temperature at which the hexavalent chromium is disassociated from the surface and reduced to trivalent chromium and byproducts. After the hexavalent chromium is disassociated and reduced it is able to be collected in the step 440 and safely disposed. In some embodiments, the less-toxic trivalent chromium and byproducts is collected by conventional filtration techniques. As described above, the laser-based ablation method for zinc chromate rapidly removes the zinc chromate coat without damaging the substrate material while simultaneously converting the hexavalent chromium to less toxic particulate forms of trivalent chromium ($Cr_2O_3$).

Figure 5:
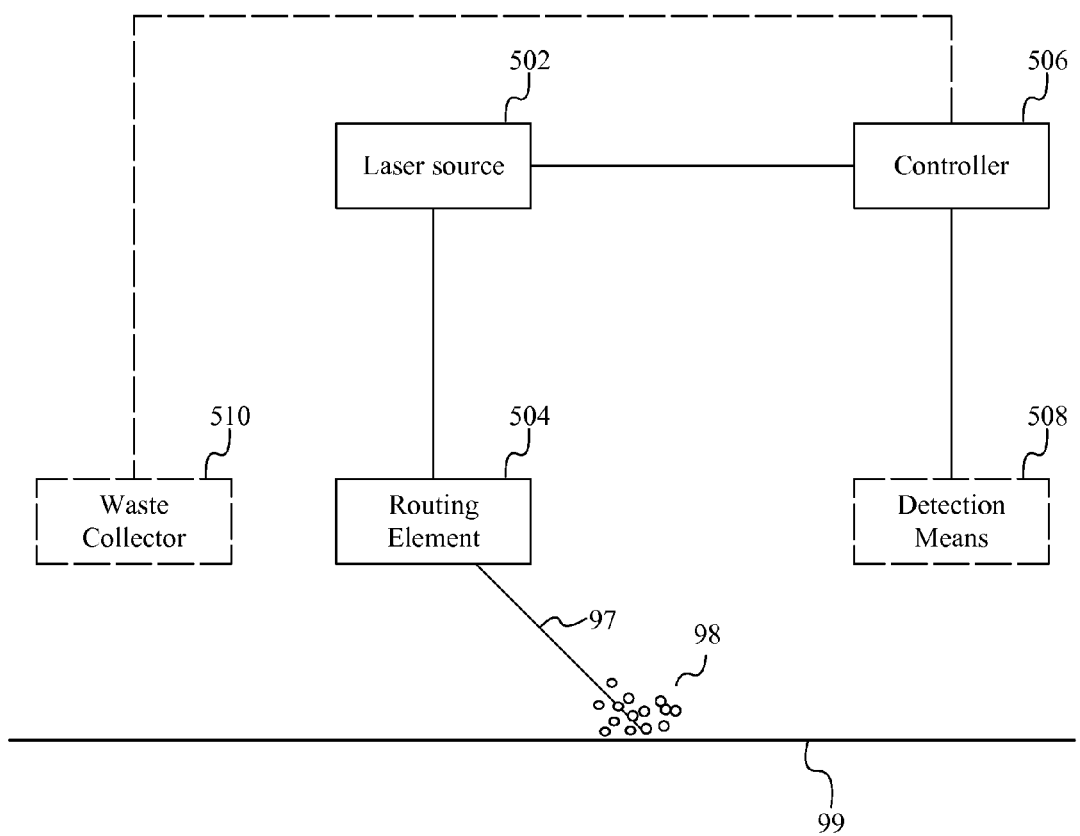
FIG. 5 illustrates a laser-based system for removing an identified coating from a surface according to some embodiments.

FIG. 5 illustrates a laser-based coating removal system for the environmentally beneficial removal of surface coatings in accordance with some embodiments. The system 500 comprises a laser source 502, a routing element 504, and a controller 506 for removing a coating 98 from a surface 99. The laser source 502 is directed to the coating 98 on the surface 99 by the routing element 504. Specifically, the routing element 504 directs the laser pulse 97 to the surface 99 in order to remove the coating 98 from the surface 99, as described above. When the laser pulse 97 contacts the surface 99, the temperature of the surface is immediately elevated to a critical temperature at which the coating 98 is disassociated from the surface 99. In some embodiments, the routing element 504 comprises one or more beam splitters and/or scanning optics which direct the laser pulse 97 to the surface.

As shown in FIG. 5, in some embodiments, the system 500 comprises a detection means 508 for detecting the removal of the coating 98 from the surface 99 and a waste collector 510 for collecting the waste byproducts resulting from the laser pulse 97 contacting the surface 99. In some embodiments, the waste collector 510 includes a local storage for storing the collected ablated waste byproduct. Alternatively, the waste collector 510 acts as a waste removal apparatus and is coupled to an external waste receptacle.

In some embodiments, the routing element 504 and the detection means 508 are of the type as described in the co-owned U.S. Pat. No. 7,633,033 and entitled "Color Sensing for Laser Decoating", which is hereby incorporated by reference. In some embodiments, the waste collector 510 of the type as described in the co-owned U.S. Pat. No. 7,009,141 and entitled "Laser Scanning Head with Rotary Scanning Coaxial Refractive Optics", which is also hereby incorporated by reference.

The laser pulse is able to comprise a fluence in the range of 1-10 Joules per square centimeter ($J/cm^2$) depending on the coating and the substrate. In some embodiments, the irradiance of the laser pulse is in the range of 6-60 Mega-Watts per square cm ($MW/cm^2$). Particularly, the laser pulse power is sufficient in combination with the laser optics and beam quality to achieve the desired irradiance. Additionally, the laser ablation is achieved essentially independent of the laser wavelength because Diamond-Like Carbon (DLC), Vitrified Contaminants (CMAS), and chromate-containing coatings have low transmissivity for the typical industrial laser wavelengths in the range of 0.3 μm to 10.6 μm. Further, the method is minimally affected by the laser pulse duration. Specifically, in some embodiments, the method uses a laser with a delivered average power of 350 W providing a fluence of 5 $J/cm^2$ and irradiance of 35 $MW/cm^2$.

In its application, a laser-based method of removing a coating from a surface is able to remove an identified coating from the surface and in an environmentally beneficial manner. Particularly, a laser pulse is able to be directed to a position on a surface in order to elevate the surface temperature to a critical temperature at which a coating is disassociated from the surface. Once the coating disassociates from the surface it is able to be collected and safely disposed. Thus, it is clear that the coating removal system described herein has numerous advantages. Specifically, the coating removal system is able to efficiently remove environmentally harmful coatings on a surface in a process that is environmentally beneficial in comparison to other removal mechanisms Particularly, the laser-based method rapidly raises the temperature of the surface to its critical point under strictly controlled operating parameters in order to induce the desired effects. As a result, the laser-based method avoids media-blast or chemically based processes that are time consuming and generate significant toxic waste.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A laser-based method of separately removing one of a plurality of different coatings from a surface comprising:

a. directing a laser pulse comprising a delivered power of 350 W, a fluence of 5 $J/cm^2$ and an irradiance of 35 $MW/cm^2$ to a first position for removing the coating on the surface;

b. removing the coating from the first position by using the laser pulse to rapidly elevate a surface temperature of the first position to the critical temperature as determined by the coating, wherein at the critical temperature the coating separates and is removed from the surface; and c. collecting the coating that has been separated and removed.

2. The method of claim 1 wherein the coating comprises an environmentally harmful substance.

3. The method of claim 2 wherein the surface temperature of the first position is elevated to a temperature at which hexavalent chromium is separated from the surface and reduced to a particulate form of trivalent chromium.

4. The method of claim 2 wherein the coating comprises hexavalent chromium.

5. The method of claim 4 wherein the surface temperature of the first position is elevated to a temperature at which at least a portion of the hexavalent chromium is separated from the surface and reduced to a particulate form of trivalent chromium.

6. The method of claim 1 wherein the coating comprises diamond-like carbon or vitrified contaminant material comprising a mixture of calcium oxide, magnesium oxide, aluminum oxide, and silicon oxide.

7. The method of claim 6 wherein the surface temperature of the first position is elevated to an oxidation temperature of the diamond-like carbon and the diamond like carbon is converted to vapor-phase carbon dioxide before it is collected.

8. The method of claim 6 wherein the surface temperature of the first position is elevated so that the calcium oxide, magnesium oxide, aluminum oxide, and silicon oxide are separated from the surface by disrupting one or more chemical bonds.

9. The method of claim 1 wherein coating that has been separated and removed is collected by a waste collector.

10. The method of claim 1 wherein heat conduction into the surface from the laser pulse is limited to prevent damage to the surface.

11. The method of claim 1 wherein separation of the coating occurs at a wavelength of the laser pulse with a low transmissivity with respect to the coating.

12. The method of claim 1 further comprising moving the laser pulse to a second position in order to remove a coating from the second position.

13. A laser-based coating removal system for separately removing one of a plurality of different coatings from a surface, the system comprising:

a. a surface comprising one of the plurality of coatings; and b. a laser based removal apparatus comprising i. a laser source to provide a laser pulse comprising a delivered power of 350 W, a fluence of 5 $J/cm^2$ and an irradiance of 35 $MW/cm^2$ to a first position of the coating on the surface, wherein the laser source removes the coating from the surface by using the laser pulse to rapidly elevate a surface temperature of the first position to the critical temperature determined by the coating, wherein at the critical temperature the coating separates and is removed from the surface.

14. The system of claim 13 wherein the coating comprises an environmentally harmful substance.

15. The system of claim 14 wherein the surface temperature of the first position is elevated to a temperature at which the hexavalent chromium is separated from the surface and reduced to a particulate form of trivalent chromium.

16. The system of claim 14 wherein the coating comprises hexavalent chromium.

17. The system of claim 13 wherein the coating comprises diamond-like carbon or vitrified contaminant material comprising a mixture of calcium oxide, magnesium oxide, aluminum oxide, and silicon oxide.

18. The system of claim 17 wherein the surface temperature of the first position is elevated to an oxidation temperature of the diamond like carbon and the diamond like carbon and it is converted to vapor-phase carbon dioxide before it is collected.

19. The system of claim 17 wherein the surface temperature of the first position is elevated so that the calcium oxide, magnesium oxide, aluminum oxide, and silicon oxide are separated from the surface by disrupting one or more chemical bonds.

20. The system of claim 13 wherein coating that has been separated and removed is collected by a waste collector.

21. The system of claim 13 wherein heat conduction into the surface from the laser pulse is limited to prevent damage to the surface.

22. The system of claim 13 wherein separation of the coating occurs at a wavelength of the laser pulse with a low transmissivity with respect to the coating.

23. A method for removing diamond-like carbon coating from a surface comprising:
  a. directing a laser pulse comprising a delivered power of 350 W, a fluence of 5 J/cm$^2$ and an irradiance of 35 MW/cm$^2$ to a first position on the surface;
  b. elevating a surface temperature of the first position using the laser pulse to an oxidation temperature of the diamond-like carbon thereby converting the diamond-like carbon to vapor-phase carbon dioxide;
  c. collecting separated diamond-like carbon from the surface; and
  d. using feedback control to immediately suppress the laser pulse when the diamond-like carbon coating is removed.

24. A method of removing vitrified contaminant material comprising a mixture of calcium oxide, magnesium oxide, aluminum oxide, and silicon oxide from a surface comprising:
  a. directing a laser pulse comprising a delivered power of 350 W, a fluence of 5 J/cm$^2$ and an irradiance of 35 MW/cm$^2$ to a first position of the coating on the surface;
  b. elevating a surface temperature of the first position to a critical temperature using the laser pulse at which point the calcium oxide, magnesium oxide, aluminum oxide, and silicon oxide are separated and removed from the surface; and
  c. collecting the separated calcium oxide, magnesium oxide, aluminum oxide, and silicon oxide from the surface.

25. A method for removing hexavalent chromium from a surface comprising:
  a. directing a laser pulse comprising a delivered power of 350 W, a fluence of 5 J/cm$^2$ and an irradiance of 35 MW/cm$^2$ to a first position of the coating on the surface;
  b. elevating a surface temperature of the first position using the laser pulse to a critical temperature at which the hexavalent chromium is separated and removed from the surface and reduced to a particulate form of trivalent chromium and particulate effluent; and
  c. collecting the trivalent chromium and particulate effluent from the surface.

26. The method of claim 25, wherein separated hexavalent chromium, trivalent chromium, and particulate effluent is collected from the surface.

\* \* \* \* \*